Nov. 8, 1960
W. E. BRADLEY
2,959,778
TRANSMIT-RECEIVE DEVICE
Filed Nov. 19, 1956
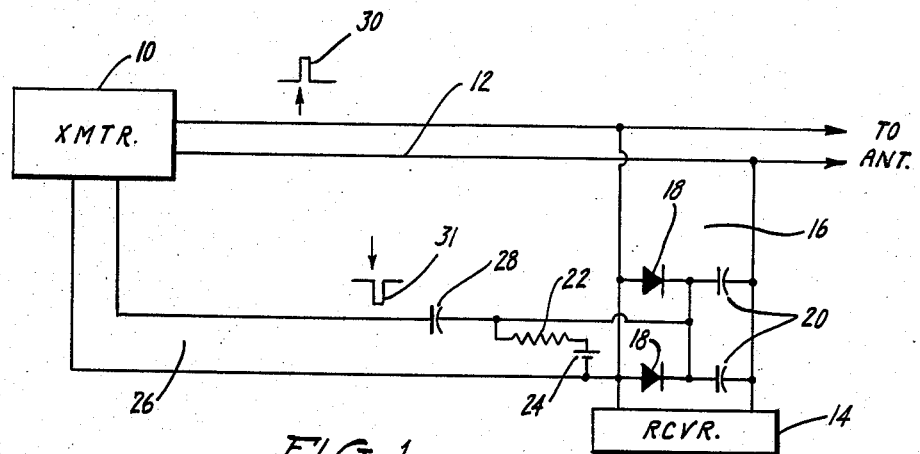
FIG. 1.
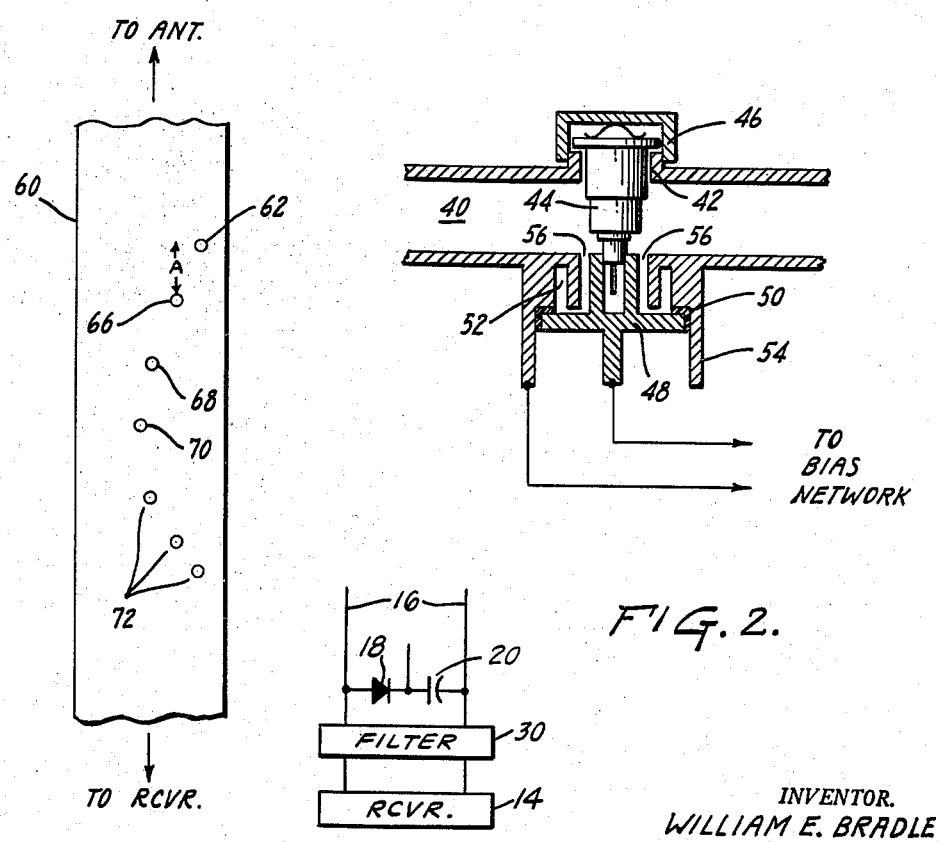
FIG. 3.   FIG. 1A.
FIG. 2.
INVENTOR.
WILLIAM E. BRADLEY
BY
ATTORNEY

United States Patent Office 2,959,778
Patented Nov. 8, 1960

2,959,778

TRANSMIT-RECEIVE DEVICE

William E. Bradley, New Hope, Pa., assignor to Philco Corporation, Philadelphia, Pa., a corporation of Pennsylvania Filed Nov. 19, 1956, Ser. No. 623,153

16 Claims. (Cl. 343—5)

The present invention relates to radar systems and more particularly to improved transmit-receive devices for compact, light weight radar systems.

Recent advances in the electronic art have made possible extremely compact and reliable video receivers for short range radar systems. An X-band receiver of this type may comprise simply a low noise video detector crystal followed by a transistor video amplifier. The crystal may be a germanium point contact rectifier of the type employed in radar mixers. If desired the video amplifier may be direct coupled and stabilized by D.-C. feedback in order to reduce the number of components and to make it even more compact and more reliable. Compact, reliable, low-power transmitters are available in the form of klystron oscillators or C.W. magnetrons operated in a pulsed mode as disclosed and claimed in the copending application of Thomas J. Ryan, Serial No. 586,965, filed May 24, 1956, now Patent No. 2,844,725.

These compact, reliable receivers and transmitters have led to the development of low-power, short-range pulse type radar systems for a wide variety of uses. In radar systems in general and in such compact, low-power systems in particular it is generally desirable to connect both the receiver and transmitter to the same antenna. If this is done it is necessary to employ a transmit-receive device, usually abbreviated T-R device, in the line leading to the receiver in order to prevent the transmitted signal from reaching and damaging the receiver. Conventional T-R devices suffer from the disadvantage that they do not respond instantly to the transmitted pulse but allow a short but high power pulse to pass through. The passage of this pulse or "spike" may cause serious damage to, or result in permanent loss of sensitivity of, a crystal video receiver of the type described. Conventional T-R devices suffer from the further disadvantage that they require an appreciable time to deionize. Therefore the receiver sensitivity is very low for a period of a few microseconds following each transmitted pulse. As a result, the minimum usable range of a radar system employing a conventional T-R device may be of the order of ⅓ to ½ a mile. This minimum range is much too great for presently envisioned types of short range radar systems. In certain forms of short range radar systems it may be desirable to gate the receiver system so that it responds only to signals occurring within a selected range interval. As an example, it might be desirable to cause the receiver system to respond only to signals originating from targets not less than 500 ft. nor more than 510 ft. from the radar system. This cannot be done by gating the video stages of the receiver since the gating pulse supplied to the video receiver would itself appear as a signal at the output of the receiver.

Therefore it is an object of the present invention to provide an improved T-R device for pulse type radar systems.

Another object is to provide a T-R device usable with a transistor video receiver.

A further object of the invention is to provide a T-R device which may be employed to range gate the receiver system.

A more particular object of the invention is to provide a novel T-R device which responds substantially instantly to an applied control signal.

A further object of the invention is to provide a novel T-R device which does not pass a spike and which may be made sensitive to received signals immediately following the termination of the transmitted pulse.

Still another object of the present invention is to provide a radar system employing a novel T-R device of the type hereinafter described.

These and other objects of the present invention which will appear as the description of the invention proceeds are achieved by providing a T-R device in the form of a transmission line which is shunted with one or more semiconducting diodes. Means are provided for biasing the diodes in a forward direction to block the passage of signals through the transmission line and, alternatively and selectively to bias the diodes in the backward direction to permit the passage of a signal. The semiconducting diodes are so arranged as to minimize the energy absorbed by each diode in either the forward biased or alternatively in the back-biased direction so that desired signals are passed with little attenuation while undesired signals are effectively blocked without damage to the individual semiconducting diodes.

For a better understanding of the invention together with other and further objects thereof reference should now be made to the following detailed description which is to be read in conjunction with the accompanying drawing in which:

Fig. 1 is a schematic diagram illustrating the electrical connection of the novel T-R device comprising the present invention;

Fig. 1A is a fragmentary schematic diagram showing a modification of the system of Fig. 1;

Fig. 2 is a drawing partially in section showing one form of waveguide mount for the semiconducting diodes of Fig. 1; and Fig. 3 is a plan view of a waveguide T-R device employing a plurality of semiconducting diodes.

Turning now to Fig. 1, block 10 represents a pulse type transmitter. This transmitter is connected to an antenna (not shown in Fig. 1) by means of a transmission line 12. Since transmitter 10 will normally operate at ultrahigh or microwave frequencies, transmission line 12 will usually take the form of a coaxial line or a waveguide. Block 14 represents a receiver capable of receiving and detecting target reflected echo signals. In small short range radar systems, receiver 14 may be of the crystal video type described above. The transmission line 16 associated with receiver 14 is joined to transmission line 12 in a parallel junction as shown in Fig. 1. In the absence of a transmit-receive device in line 16, the high energy pulses supplied by transmitter 10 to transmission line 12 would travel down transmission line 16 to the receiver 14. To prevent this a T-R device is inserted in transmission line 16. In Fig. 1 the T-R device comprises semiconductive diodes 18 which have one terminal connected directly to one conductor of transmission line 16 and the other terminal connected to the other conductor of transmission line 16 for radio frequency energy through D.-C. blocking capacitors 20. Semiconductive diodes 18 are preferably germanium or silicon diodes having a relatively high burn-out rating and low hole storage effect. The diode should have as low a shunt capacitance as possible consistent with the high burn-out rating. For reasons which will appear presently the diodes 18 are never biased more than a small amount in the reverse or backward direction. Therefore the noise figure of the diode is not an important design factor. In fact crystal diodes which cannot be used as mixer elements because of their high noise figure may be employed successfully in the present application. Examples of commercially available diodes suitable for use in the circuit of Fig. 1 are the 1N21B, 1N21C, 1N263 and 1N28. The diode disclosed in this application employs a relatively large whisker in contact with an extremely thin semiconductive body. Older forms of semiconductive devices employing point or whisker contacts are not suitable for this application since any diodes of this type, which will change from the conducting to non-conducting state in less time than it takes a conventional T-R device to deionize, have a relatively low burn-out characteristic and hence would be destroyed by the application of the transmitted pulse.

Turning once again to Fig. 1, the junction between capacitors 20 and diodes 18 are connected to one end of a biasing network comprising resistor 22 and bias battery 24 connected in series. The other terminal of this biasing network is connected to the other terminal of diodes 18. The potential supplied by bias battery 24 is sufficient to bias diodes 18 into the backward or non-conducting region by an amount slightly greater than the maximum amplitude of the received signal. Diodes 18 will normally be biased in the backward direction by battery 24. However, for the duration of each transmitted pulse they are biased well into the forward or conducting region by a video pulse supplied to the biasing network by way of transmission line 26 and coupling capacitor 28. Capacitor 28, in series with one conductor of transmission line 26, serves as a coupling capacitor for the video pulse and a blocking capacitor for the D.-C. bias supplied by battery 24.

The circuits between the T-R device and the detector crystal of the receiver should include means having a high pass or band-pass characteristic in order to prevent the T-R gating pulse from appearing across the detector crystal. Fig. 1A shows a modification of a portion of the circuit of Fig. 1 in which a filter 30 is inserted between the T-R device 18 and receiver 14 for the purpose of blocking this pulse. If this pulse is not excluded from the receiver it might damage the detector crystal or at least appear as an unwanted signal in the output of the receiver. In the waveguide version of the T-R device, the waveguide itself provides the necessary high pass characteristic. In a radar system employing a coaxial line between the antenna and the receiver the necessary band-pass characteristic may be provided by the intermediate frequency stages of a superheterodyne receiver. If a crystal video receiver is used with a coaxial line feed, some form of active or passive filter network should be inserted.

The system shown in Fig. 1 operates in the following manner. Transmitter 10 generates a pulse of high frequency energy having an envelope substantially in the form shown by pulse 30 of Fig. 1. The arrow adjacent pulse 30 represents an arbitrarily selected reference time. Transmitter 10 also generates a video pulse substantially synchronously with the generation of the transmitted pulse. This video pulse, shown at 31 in Fig. 1, is supplied by way of transmission line 26 to the circuit 28, 22, 24. The arrow adjacent pulse 31 again represents the arbitrarily selected reference time mentioned above. The video pulse 31 is impressed across resistor 22 and biases diodes 18 in the forward or conducting direction. As mentioned above, capacitors 20 have substantially zero impedance at the frequency of the transmitted pulse. Therefore the series combinations of diodes 18 and capacitors 20 present very low impedances across the transmission line 16 when diodes 18 are biased in the forward direction.

The diode 18 nearest the junction of transmission lines 12 and 16 is spaced approximately ¼ wavelength from this junction. The low impedance presented by the series combination nearest the junction of transmission lines 12 and 16 is reflected as a very high impedance or open circuit across the junction. Since transmission line 16 presents a high impedance at the junction, very little energy will travel down transmission line 16 to the receiver 14. In some instances it may be possible to employ a single series combination of diode 18 and capacitor 20. However, in most applications it will be preferable to employ a plurality of series combinations spaced along the waveguide at intervals less than a half wavelength. The spacing should be so selected that the impedance looking into transmission line 16 at the junction is a maximum when all of the diodes are biased in the forward direction.

Following the termination of the transmitted pulse, the negative pulse signal impressed across resistor 22 is removed and diodes 18 will be biased in the backward direction by battery 24. When biased in the backward direction, diodes 18 act as a relatively small capacitance shunted across transmission line 16. By properly positioning the diodes 18 in transmission line 16 the effect of these capacitances on signals passing down transmission line 16 is minimized so that substantially all of the received energy reaching the junction of transmission lines 12 and 16 is supplied to receiver 14. A preferred arrangement of diodes 18 is shown in Fig. 3 which will be described presently.

Diodes 18 may be mounted in the waveguide or coaxial line which forms transmission line 16 using a mount of the type normally employed for mixer crystals. Mounts of this type are well known in the art. For example mounts for both coaxial line and waveguide are described in Microwave Mixers, Massachusetts Institute of Technology Radiation Laboratory Series, volume 16, McGraw-Hill Book Company, Inc., 1948. By way of further illustration, a diode mount suitable for use in a waveguide is shown in Fig. 2. In Fig. 2 the waveguide 40 is shown in section. A flanged opening 42 is formed in one broad wall of the waveguide to receive the ceramic diode cartridge 44. Diode cartridge 44 is held in place by a cap 46 which makes contact between one end of the diode and the wall of the waveguide. This connection corresponds to the connection of the diodes 18 to the left hand conductor of transmission line 16 of Fig. 1. The other end cartridge 44 is connected to a member 48 which is insulated from the waveguide structure by dielectric member 50. The spacing between member 48 and portion 54 of waveguide 40 is such that a short circuit exists between these two members at the frequencies present in waveguide 40. Member 48 and the cooperating part 54 of waveguide 40 are so formed as to provide a folded short-circuited transmission line 52 which is approximately one-half wavelength long. Therefore at radio frequencies the short circuit at the end of this transmission line 52 is reflected as a short circuit between member 48 and the wall of waveguide 40 at point 56. The short-circuited transmission line section 52 and the capacitor formed by member 48, member 54 and dielectric 50 cooperate to perform the function of capacitor 20 of Fig. 1. The biasing potentials for diode 44 may be supplied between member 48 and 54 of Fig. 2.

In the system just described the receiver will respond to signals received from targets at all ranges up to the maximum range of the system. If it is desired to range gate the input to the receiver, it is only necessary to modify the signal supplied to the diodes 18. For example, the polarity of bias battery 24 may be reversed so that diodes 18 are normally biased in the forward direction. In the absence of any gating signal the diodes will attenuate not only the signal resulting from the transmitted pulse but also all target reflected echo signals. A positive pulse may be supplied to transmission line 26 to bias the diodes 18 in the reverse direction during the interval in which target echoes are to be received. The pulse should have a duration equal to the desired range interval. The time interval between the occurrence of a transmitted pulse and the occurrence of the next gating pulse is determined by the range to the selected range interval. This delay may be established by any convenient form of delay means. If the selected range interval is to remain at a fixed range, a suitable delay line may be employed between the transmitter 10 and transmission line 26. If the range at which the selected range interval is to occur is to be under the control of the operator or a circuit within the receiver, a delay multivibrator or other controllable delay device synchronized from the transmitter may be employed. The present T-R device is particularly well suited to range gating short range radar systems since the semiconducting diodes can be switched rapidly from the non-conducting condition, i.e. back biased condition, to the conducting condition.

Fig. 3 is a sketch illustrating the preferred arrangement of a plurality of diodes along a waveguide 60 for handling relatively high power transmitted pulses. The first diode 62 in the direction of the transmitter is disposed near one narrow wall 64 of waveguide 60. As is well known, the electric field in a waveguide is a maximum near the center and decreases toward the narrow wall of the waveguide. Therefore diode 62 will be in a field of relatively low strength compared to the field at the center of the waveguide. Diode 62, when biased in the forward direction, will act as an inductive post rather than a true short circuit across the waveguide. The energy in the waveguide on the receiver side of diode 62 will be somewhat attenuated owing to the presence of diode 62. A second diode 66 is placed in the waveguide at a point nearer the center of the broad wall than diode 62. However, since diode 62 provided a partial attenuation of the energy in waveguide 60, the current through diode 66 can be made approximately equal to the current through diode 62. The spacing A between diodes 62 and 66 parallel to the longitudinal axis of waveguide 60 is made such that the low impedance presented by diode 66 is reflected as substantially a short circuit at diode 62. Additional diodes 68 and 70 may be located in waveguide 60 at points progressively nearer the center of the waveguide, the spacing from the center to each diode being determined in part by the amount of attenuation introduced by other diodes nearer the transmitter than the diode in question. All of the diodes 62, 64, 68 and 70 are so positioned that impedance looking into waveguides 60 at a point corresponding to the junction of waveguides 12 and 16 of Fig. 1 when diodes 62, 64, 68 and 70 are biased in the forward direction is a maximum. If the diodes are arranged in this manner a minimum amount of energy from the transmitted pulse will pass down waveguides 60 to the receiver. The diodes 62, 66, 68 and 70 are preferably connected in parallel to a source of suitable biasing potential as illustrated in Fig. 1.

As mentioned previously, when diodes 62, 66, 68 and 70 are biased in the backward direction, they provide a minimum of interference to the signal passing down waveguides 60 to the receiver. The back biased diodes appear only as a small capacitance shunting the transmission line. The progression of diodes 62, 66, 68 and 70 from the narrow wall toward the center of the waveguide serves to minimize the reflection of the low level received signal passing down waveguide 60 caused by the back biased diode. This progression of diodes toward the center of the waveguide may be compared to the tapering of vane type members employed in conventional forms of vane type attenuators and phase shifters. Vane type attenuators are usually tapered at the ends to reduce reflection of signal within the waveguide.

To still further minimize unwanted reflections presented by diodes just described, additional diodes 72 may be connected across the waveguide. The spacing between diodes 72 and diodes 62, 66, 68 and 70 may be such that reflections presented by the four diodes nearest the antenna are cancelled by reflections from the diodes 72. Alternatively, diodes 72 may be replaced by suitable tuning devices such as capacitive screws passing through the broad wall of the waveguide. While the arrangement shown in Fig. 3 is believed to be one which will give highly satisfactory results in practice, the invention is not to be limited to this particular arrangement of diodes. Other suitable arrangements may be selected by treating the diodes as inductive posts when biased in the forward direction and shunt capacitors when biased in the backward direction and then applying known waveguide transmission theory to select the optimum position of the diodes.

While the invention has been described with reference to the preferred embodiments thereof, it will be apparent that various modifications and other embodiments thereof will occur to those skilled in the art within the scope of the invention. Accordingly I desire the scope of my invention to be limited only by the appended claims.

What is claimed is:

1. In a radar system including a transmitter, an antenna, a receiver, and a distributed constant signal transmission means connecting said receiver and said transmitter to said antenna, a T-R device associated with said transmission mean in a region intermediate the ends thereof, said T-R device comprising at least one semiconducting diode connected in shunt with said transmission means at the frequency of the signal supplied by said transmitter, and means for biasing said one diode selectively in the forward or backward directions independently of the signals propagated through said transmission means.

2. In a radar system including a transmitter, an antenna, a receiver, and signal transmission means connecting said receiver and said transmitter to said antenna, a T-R device associated with said transmission means, said T-R device comprising a plurality of semiconducting diodes connected in shunt with said transmission means at the frequency of the signal supplied by said transmitter, said diodes being differently distant from said receiver, and means for simultaneously biasing all of said diodes selectively in the forward or backward directions.

3. In a radar system including a transmitter, an antenna, a first transmission line connecting said transmitter to said antenna, a receiver, and a second transmission line connected at one end to said receiver, the other end of said second transmission line forming a junction with said first transmission line, a T-R device associated with said second transmission line, said T-R device comprising a plurality of semiconducting diodes connected in shunt with said transmission line at the frequency of the signal supplied by said transmitter, said diodes being so positioned relative to said junction as to cause the input impedance of said second transmission line to appear as a high impedance at said junction if said diodes are biased in the forward direction, and means for simultaneously biasing all of said diodes selectively in the forward or backward directions.

4. In a radar system including a pulse type transmitter, an antenna, a first transmission line connecting said transmitter to said antenna, a receiver, and a second transmission line connected at one end to said receiver, the other end of said second transmission line forming a parallel junction with said first transmission line, a T-R device associated with said second transmission line, said T-R device comprising a plurality of semiconducting diodes connected in shunt with said transmission line at the frequency of said signal supplied by said transmitter, said diodes being so positioned as to jointly cause the input impedance of said second transmission line to be substantially infinite at said junction if said diodes are biased in the forward direction, and means for simultaneously biasing said diodes in the forward direction during the occurrence of a pulse from said pulse transmitter and in the backward direction in the absence of a pulse from said transmitter.

5. A T-R device for a radar system or the like comprising a distributed constant transmission line, at least one semiconducting diode connected in shunt with said transmission line for radio frequency energy at a point intermediate the ends of said transmission line, means for biasing said one diode selectively in the forward direction or in the backward direction independently of the signals propagated through said transmission line.

6. A T-R device for a radar system or the like comprising a transmission line, a plurality of semiconducting diodes connected in shunt with said line for radio frequency energy, said diodes being differently distant from a first end of said transmission line, said diodes being so positioned in said transmission line as to cause the input impedance of said transmission line at said first end to appear as a substantially infinite impedance if said diodes are biased in the forward direction, and means for simultaneously biasing all of said diodes selectively in the forward direction or in the backward direction.

7. A T-R device for a radar system or the like comprising a rectangular waveguide, a plurality of semiconducting diodes connected between the broad walls of said waveguide for radio frequency energy, said diodes being differently distant from a first end of said waveguide and differently distant from the side walls of said waveguide, said diodes being so positioned in said waveguide as to cause the input impedance of said waveguide at said first end to appear as a substantially infinite impedance if said diodes are biased in the forward direction, means for simultaneously biasing all of said diodes in the backward direction, and means for alternatively biasing said diodes in the forward direction.

8. A T-R device for a radar system or the like comprising a rectangular waveguide sized to operate in the dominant mode, a plurality of semiconducting diodes connected between the broad walls of said waveguide for radio frequency energy, said diodes being differently distant from a first end of said waveguide and differently distant from the narrower walls of said waveguide, the diode nearest said first end of said waveguide being nearer one narrower wall of said waveguide than the diode next more remote from said first end, said diodes being so positioned in said waveguide as to cause the input impedance of said waveguide at said first end to appear as a substantially infinite impedance if said diodes are baised in the forward direction, means for simultaneously biasing all of said diodes in the backward direction, and means for alternatively biasing said diodes in a forward direction.

9. A T-R device as in claim 8 wherein said diodes are arranged progressively nearer the center of said waveguide as they are progressively more remote from said first end of said waveguide.

10. A T-R device as in claim 8 wherein the displacements of the diodes from a narrower wall of said waveguide first increase and then decrease with increasing remoteness of said diodes from said first end of said waveguide.

11. A radar system including a transmitter, an antenna, a receiver including a detector means, signal transmission means connecting said receiver and said transmitter to said antenna, a T-R device associated with said transmission means, said T-R device comprising at least one semiconducting diode connected in shunt with said transmission means at the frequency of the signal supplied by said transmitter, and means for biasing said one diode selectively in the forward or backward direction, the combination of said transmission means and said receiver including means interposed between said T-R device and said detector means for excluding all signals below a preselected frequency.

12. A radar system including a transmitter, an antenna, a first transmission line connecting said transmitter to said antenna, a receiver including a detector means, a second transmission line connected at one end to said receiver, the other end of said second transmission line forming a junction with said first transmission line, a T-R device associated with said second transmission line, said T-R device comprising a plurality of semiconducting diodes connected in shunt with said transmission line at the frequency of the signal supplied by said transmitter, said diodes being so positioned relative to said junction as to cause the input impedance of said second transmission line to appear as a high impedance at said junction if said diodes are biased in the forward direction, and means for biasing all of said diodes selectively in the forward or backward directions, the combination of said second transmission line and said receiver including means interposed between said T-R device and said detector means for excluding all signals below a preselected frequency.

13. A T-R device for a radar system or the like comprising a transmission line, a plurality of semiconducting diodes connected in shunt with said line for radio frequency energy, said diodes being differently distant from a first end of said transmission line, and means for simultaneously biasing all of said diodes selectively in the forward direction or in the backward direction independently of any signals propagated through said transmission line.

14. A T-R device for a radar system or the like comprising a rectangular waveguide, a plurality of semi-conducing diodes connected between the broad walls of said waveguide for radio frequency energy, said diodes being differently distant from a first end of said waveguide and differently distant from the side walls of said waveguide, means for simultaneously biasing all of said diodes in the backward direction, and means for alternatively biasing said diodes in the forward direction independently of any signals propagated through said waveguide.

15. A T-R device for a radar system or the like comprising a rectangular waveguide, at least one semi-conducting diode connected between the broad walls of said waveguide for radio frequency energy, said diode being so positioned in said waveguide as to cause the input impedance of said waveguide at a first end to appear as a substantially infinite impedance if said diode is biased in the forward direction, means for biasing said diode in the backward direction, and means for alternatively biasing said diode in the forward direction independently of any signal propagated through said waveguide.

16. A T-R device for a radar system or the like comprising a rectangular waveguide, at least one semi-conducting diode connected between the broad walls of said waveguide for radio frequency energy, said diode being so positioned in said waveguide as to cause the input impedance of said waveguide at a first end to appear as a substantially infinite impedance if said diode is biased in the forward direction, and means for biasing said diode selectively in the forward direction or in the backward direction independently of any signal propagated through said waveguide.

References Cited in the file of this patent

UNITED STATES PATENTS

| 2,483,187 | Dolberg | Sept. 27, 1949 |
| 2,654,834 | Zarky | Oct. 6, 1953 |